US006470327B1

(12) United States Patent
Carroll et al.

(10) Patent No.: US 6,470,327 B1
(45) Date of Patent: Oct. 22, 2002

(54) METHOD AND SYSTEM FOR COMMUNICATING WITH A POSTAGE METER THROUGH A WEB-BROWSER IN A POSTAL OR SHIPPING SYSTEM

(75) Inventors: Terri A. Carroll, Trumbull, CT (US); David A. Ellis, Wallingford, CT (US); Jacques Hasbani, Easton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/474,585

(22) Filed: Dec. 29, 1999

(51) Int. Cl.[7] .............................................. G07B 17/00
(52) U.S. Cl. ..................... 705/401; 705/410; 709/220; 709/221; 709/222; 713/1; 713/2; 713/100
(58) Field of Search ................................ 705/401, 410; 709/220, 221, 222; 713/1, 2, 100

(56) References Cited

U.S. PATENT DOCUMENTS

| | | | | |
|---|---|---|---|---|
| 5,369,401 A | * | 11/1994 | Haines ........................ | 705/403 |
| 5,710,706 A | * | 1/1998 | Markl et al. ................. | 705/409 |
| 5,812,400 A | * | 9/1998 | Eddy et al. .................. | 705/410 |
| 5,852,813 A | * | 12/1998 | Guenther et al. ........... | 705/408 |
| 5,983,209 A | * | 11/1999 | Kara ........................... | 705/407 |
| 6,067,568 A | * | 5/2000 | Li et al. ....................... | 709/223 |
| 6,199,108 B1 | * | 3/2001 | Casey et al. ................. | 709/220 |
| 6,289,212 B1 | * | 9/2001 | Stein et al. .................. | 455/412 |

FOREIGN PATENT DOCUMENTS

| | | | |
|---|---|---|---|
| WO | WO-97/14117 A2 | * | 4/1997 |
| WO | WO-98/14909 A2 | * | 4/1998 |

OTHER PUBLICATIONS

"Function Signature Architecture for Personal Computer Systems"; IBM Technical Disclosure Bulletin, Oct. 1, 1988, vol. 31, No. 5, pp. 62–66.*

Aherns: "Making mail pay: upgrading mail operations to save time and money. (includes list of U.S. Postal Service contacts for corporate representatives to learn how to save money on postal service)(75th Anniversary Edition) (Special Advertising Supplement)", Forbes, Sep. 14, 1992, vol. 150, No. 6, p. 239.*
Brother Direct: "Three key factors drive market New Zealand: New Laser Printers By Brother": NZInfo Tech Weekly (XXX) Oct. 5, 1998, p. 1.*
Terrell: "Licking stamps"; U.S. News & World Report, Sep. 28, 1998, vol. 125, No. 12, pp. 67–69.*

* cited by examiner

Primary Examiner—Edward R. Cosimano
(74) Attorney, Agent, or Firm—Ronald Reichman; Angelo Chaclas

(57) ABSTRACT

The invention is a method and system for sending a print indicia command to a postage meter from a browser under control of a carrier management application in a data processing system which comprises a client node in communication with a provider server. The method begins with a system user logging onto a carrier manager application web site, through a web browser. The user requests that the web site download a set of programs from the web site to the client node while utilizing JAVA script functionality resident in the provider web pages. The script functionality further comprises a set of instructions for performing one or more activities. The programs are installable on a PC located at the client node and are for establishing control of the postage meter. Downloading of the programs further comprises installing and configuring an automation server and a postage meter driver at the client node. The postage meter is configured by identifying a set of characteristics of the postage meter; and, downloading the postage meter driver from the web site to the postage meter in accordance with the set of characteristics. Once the postage meter is configured, the system user logs onto the application:and enters a set of parameters representative of a an item to be shipped. The application identifies a carrier and a print indicia signal is sent to the postage meter, through the web browser, representative of the transaction cost.

23 Claims, 5 Drawing Sheets

METHOD AND SYSTEM FOR COMMUNICATING WITH A POSTAGE METER THROUGH A WEB-BROWSER IN A POSTAL OR SHIPPING SYSTEM

RELATED APPLICATIONS

Reference is made U.S. Pat. No. 6,356,882, entitled A METHOD AND SYSTEM FOR INPUTTING A WEIGHT TO A BROWSER IN AN INTERNET-BASED SHIPPING SYSTEM, assigned to the assignee of this application and filed on even date herewith.

Reference is made to U.S. Pat. No. 6,282,590 entitled A METHOD AND SYSTEM FOR ESTABLISHING A STANDARD PERIPHERAL INTERFACE. SERVER, assigned to the assignee of this application and filed on Sep. 15, 1998.

FIELD OF THE INVENTION

The present invention relates generally to the field of mail piece and/or parcel weighing and processing in a network; and, more specifically, to the field of printing an indicia for mailing or shipping through the use of an internet or intranet data processing environment.

BACKGROUND OF THE INVENTION

Systems that allow the user to process parcels for delivery by a carrier are known as shipping systems; or, if the intent of the system is to allow the user to choose from among the services of more than one carrier, the system may be known as a carrier management system. By whatever name, these systems (hereinafter referred to as "shipping systems") are designed to prepare parcels in accordance with the regulations of the carrier that will be picking up the parcels for later delivery.

Traditional configurations of shipping systems include low-end embedded systems, mid-range personal computer (PC) based systems, and upper end mid and main frame based systems.

Embedded systems, where the shipping application is embedded within a shipping scale, generally include PROM-based rating tables and their associated functionality. Data entries to the application are made via an operator keypad on the front of the scale or by scanning bar codes or similar symbology directly to certain fields within the application. Table data and certain rating functionality is generally added through the use of PROMs. The embedded systems are generally capable of producing a manifest for use by the carrier, as well as producing barcode or address labels for application to the parcel. These systems might also interface to a postage meter for producing proof of payment for a carrier such as the United States Postal Service.

PC-based systems are more flexible then embedded systems because they allow a greater range of peripherals, greater memory capacity, networking capabilities (both internet and intranet) and the ability to store records and address lists while accepting data download in a variety of ways. Rating and services functionality are also directed from the application, while the system shops for an appropriate rate from a database within a memory contained within the PC or from a rating table directed by a server. Address lists can be stored or forwarded as well. The ability of the PC-based system to provide a communications link to a network, while allowing integration with a client's information systems, is perhaps the greatest strength of these systems. Network links via the internet provide the system with an interface to a great number and variety of carrier web sites, increased functionality, and parcel tracking. Additionally, data relevant to shipping history for a particular location, or historical manifest data can be downloaded or uploaded in a quick and efficient manner as necessary. These systems too can also be interfaced to postage, meters for proof of payment.

The PC-based systems offer much the same functionality as the upper end mid and main frame systems. The upper systems, however, offer the advantage of exceptional processing speed while handling large volumes of. transaction data or performing multi-tasking of application services, as well as application level integration with client systems.

Parcel shipping, in general, has benefitted from efficiencies associated with PC-based systems. Labels can be printed at the desktop, weighing scales are interconnected to PCs for inputting weight to parcel shipping applications, and manifests for recording the details of parcel pickup and delivery are printed at the desktop as well. Peripherals such as postage meters for payment evidencing, scanners, and other input devices can also be added for increased data delivery.

In a PC-based environment that is serving as a stand alone system only, or that is part of a local area network (LAN), or even a wide area network (WAN), the use of a postage meter to create a proof of payment becomes an important aspect. However, in an internet-based environment, there is currently no way to show proof of payment while using an internet browser for internet-based applications being directed from a server. Traditionally, the method for producing a postage indicia while using the browser has involved the use of manual meter tripping. Therefore, a method and system are required that allows the system user to control the postage meter directly from the internet-based application while utilizing a browser.

Based on the aforementioned needs in the art, it is an object of the present invention to trip a postage meter or execute a print indicia command that is resident on, or dependent upon, an internet link (or similar network-based link) utilizing a browser.

SUMMARY OF THE INVENTION

According to the invention, the object is achieved and the disadvantages of the prior art are overcome by a method and system for tripping a postage meter from a browser under control of a carrier management application in a data processing system. The data processing system comprises a client node in communication with a provider server, wherein the tripping of the postage meter causes an indicia to be printed by the postage meter. The client node can be one of a plurality of client nodes that are linked to the data processing system and wherein any one or more of such nodes has a postage meter for printing an indicia onto a label or a mailpiece. The indicia being indicative of the cost for shipping the parcel or mailpiece.

The method begins with a system user logging onto a carrier manager application web site, through a web browser. The system user requests that the web site download a set of programs from the web site to the client node. The programs are installable on a personal computer located at the client node and are for establishing control of the postage meter by the client node under direction of the carrier management application; they include an automation server and a postage meter driver. The programs are then installed on the personal computer at the client node and used in configuring the postage meter.

Downloading of the automation server and the postage meter driver further comprises the steps of installing and configuring the automation server and the postage meter driver at the client node. The installation and configuration preclude the necessity for repeating the download for future transactions utilizing the postage meter in conjunction with the web site. The postage meter is configured through the web site by identifying a set of characteristics of the postage meter; and, downloading the postage meter driver from the web site to the client node in accordance with the set of characteristics. Each of the above installation and configuration steps is saved as an initiation set to a memory resident in;either the provider server or the client node so that the initiation set may be called by the client node to establish the initiation set.

After installation, the system user tests the communication link between the postage meter and the client node prior to logging onto the carrier management application at the web site.

Once the postage meter is configured, the system user logs onto the carrier management application and enters a set of application parameters representative of the parcel or a mailpiece to be shipped. The set of application parameters further comprises a destination, a class or type of service by which the parcel or mailpiece will be shipped, and a desired period of time for a delivery of the parcel or mailpiece. Additionally, the parameters include a weight measurement which is entered into the carrier management application for the purpose of obtaining a cost of shipping the parcel or the mailpiece; the cost is determined as a function of the weight and the set of application parameters. Once the carrier has been identified, a trip signal or print indicia command (in the case of IBIP based indicia printing) is sent to the postage meter, through the web browser, automation server, and meter driver, wherein the trip signal or print indicia command is representative of the transaction cost.

The system of the present invention includes a web site for the provider server. The web site further comprises provider web pages and JAVA script functionality resident in the provider web pages for linking with a postage meter driver resident at the client node. The script functionality further comprises a set of instructions for performing one or more activities; display functionality for displaying the cost in a particular format; a "carrier selection" function for directing the cost to be transmitted to the carrier management application; and, a setup function for storing a set of steps to be used for activating: the script functionality, postage meter driver interface functionality, and the postage meter server.

The postage meter at the client node further comprises: the postage meter itself; a postage meter server resident at the client node and callable under control of the script functionality; and, script activation capability for allowing the script at the client node to link with the postage meter by utilizing the postage meter driver.

The system also has a communications link for linking the web site and the postage meter at the client node. The communications link further comprises: a browser for accessing the web site by the client node; a network interface routine for allowing access to the network where the web site resides; and, communications means for physically interfacing the postage meter with the client node and allowing tripping of the postage meter, or acceptance of the print indicia command. The system further includes selection means for selecting the cost for shipping of the mailpiece; this selection causes the postage meter to trip, thereby causing the indicia to be printed.

DETAILED DESCRIPTION OF THE PREFERRED EMBODIMENTS

Figure 1A:
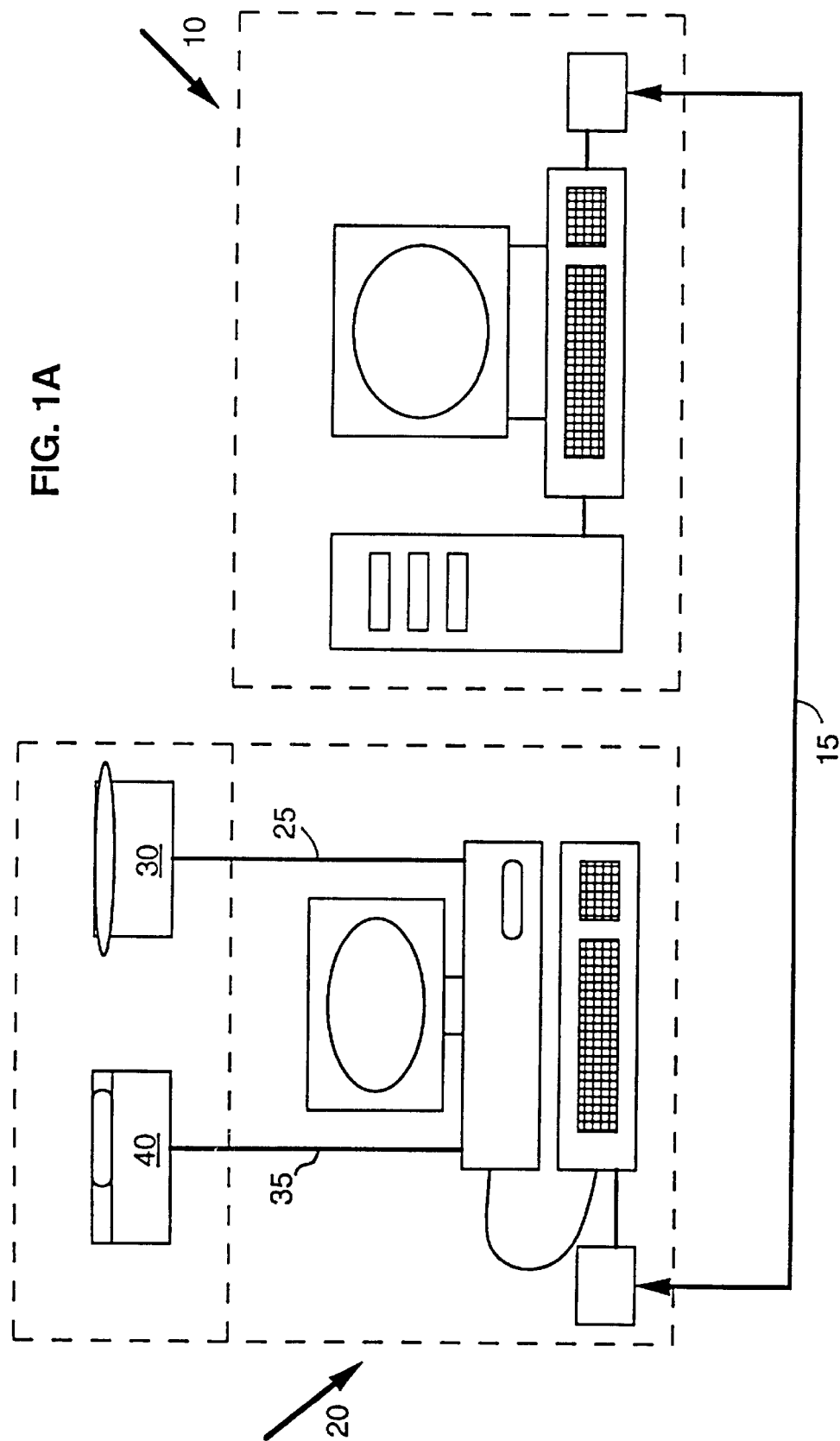
FIG. 1A diagram of the system of the present invention showing the elements of each of the high-level subsystems.

Beginning with FIG. 1A, there is shown a block diagram of the system of the present invention showing the flow between each of the high-level components of the system. A system user, who has a parcel, a mailpiece, or an article to be shipped via a carrier, accesses the overall system through subsystem 20.

Subsystem 20 is shown as a node which includes a personal computer for processing data and running certain software applications, a monitor for providing a human interface with the personal computer so as to view screens established by the application, and a keyboard for data entry. A network or modem link is also included that will allow access to interface 15. Interface 15, in the preferred embodiment, is an internet link; but, it is contemplated that the link could be any intranet or hardwired communication solution requiring a browser entry. Additional peripherals that are anticipated include a scanner for scanning barcodes and similar data, a weighing scale 30 for inputting weight to the server-based shipping application, and a postage meter 40 for printing an indicia to a label or directly to a mail piece surface. The weighing scale 30 is linked to subsystem 20 via communication link 25 which is preferably a hardwire, serial communication link. The postage meter 40, such as those available from Pitney Bowes Inc. of Stamford, Conn. is linked to subsystem 20 via communication link 35 which is preferably a hardwire, serial communication link.

Interface 15 links subsystem 10 with subsystem 20. Subsystem 10 is a remote server which hosts the web site for determining a rate for shipping a parcel or mailpiece in accordance with parameters established in the carrier management application hosted by subsystem 10; a weight parameter is returned from weighing scale 30 through communication link 25 to subsystem 20 before entry into the shipping application.

Figure 1B:
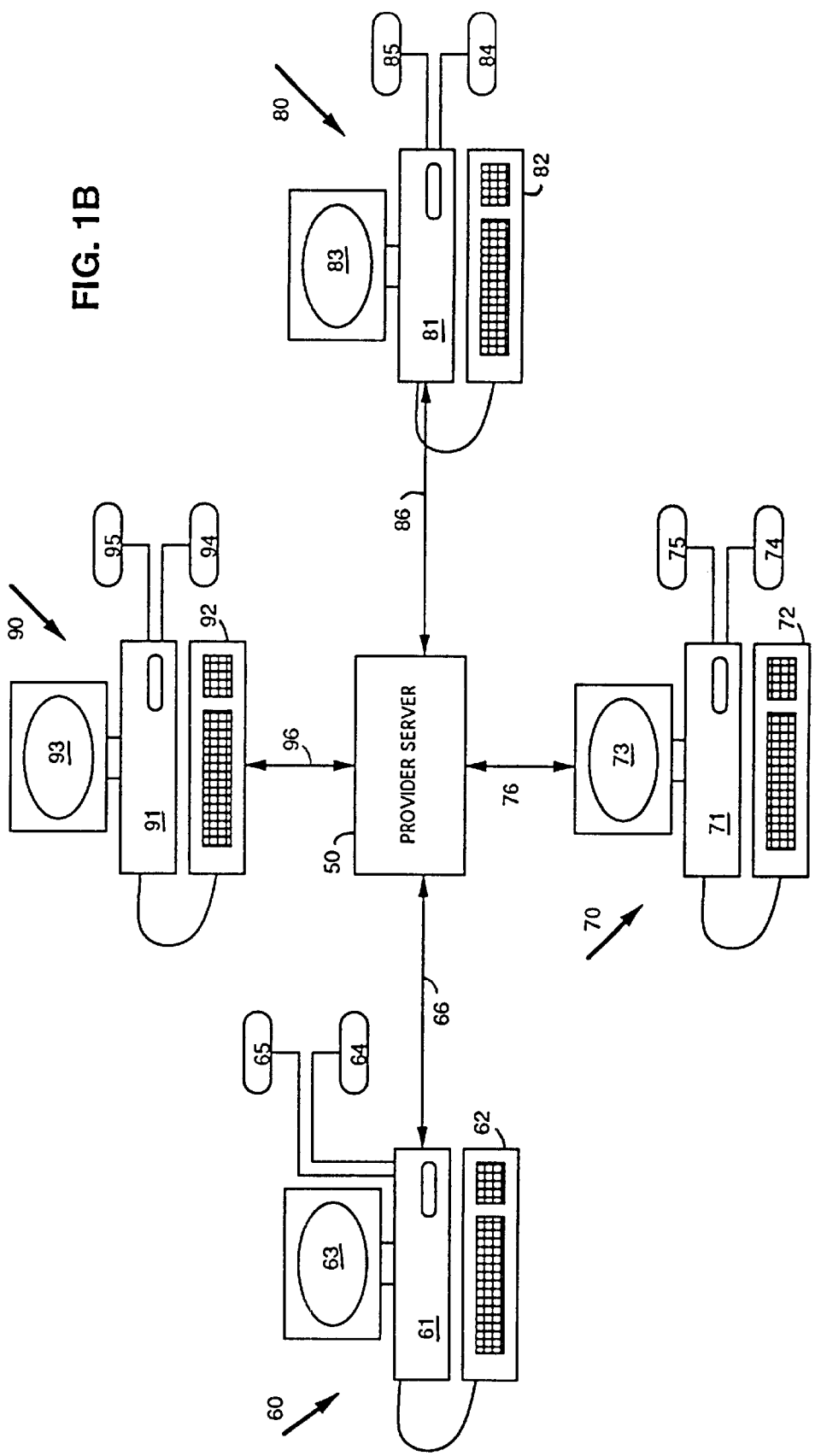
FIG. 1B is a diagram of a multi-node system wherein each node is in communication with a provider server.

Turning to FIG. 1B, there is shown a network consisting of multiple client nodes 60, 70, 80, and 90 wherein each node is linked to a common server 50. Each of client nodes 60, 70, 80, and 90 is shown as a node which includes a personal computer (61, 71, 81, 91) for processing data and running certain software applications, a monitor (63, 73, 83, 93) for providing a human interface with the personal computer so as to view screens established by the application, and a keyboard (62, 72, 82, 92) for data entry. A network or modem link is also included (though not shown) that will allow access, through a communications link (66, 76, 86, 96), to the corresponding modem of server 50. The communications link, in the preferred embodiment, is an internet link; but, it is contemplated that the link could be any intranet or hardwired communication solution requiring a browser entry. Additional peripherals that are anticipated for each of client nodes 60, 70, 80, and 90 include a scanner for scanning barcodes and similar data, a weighing scale (64, 74, 84, 94) for inputting weight to the server-based carrier management application, and a postage meter (65, 75, 85, 95) for printing a postage indicia to a mail piece or to a tape.

Figure 2:
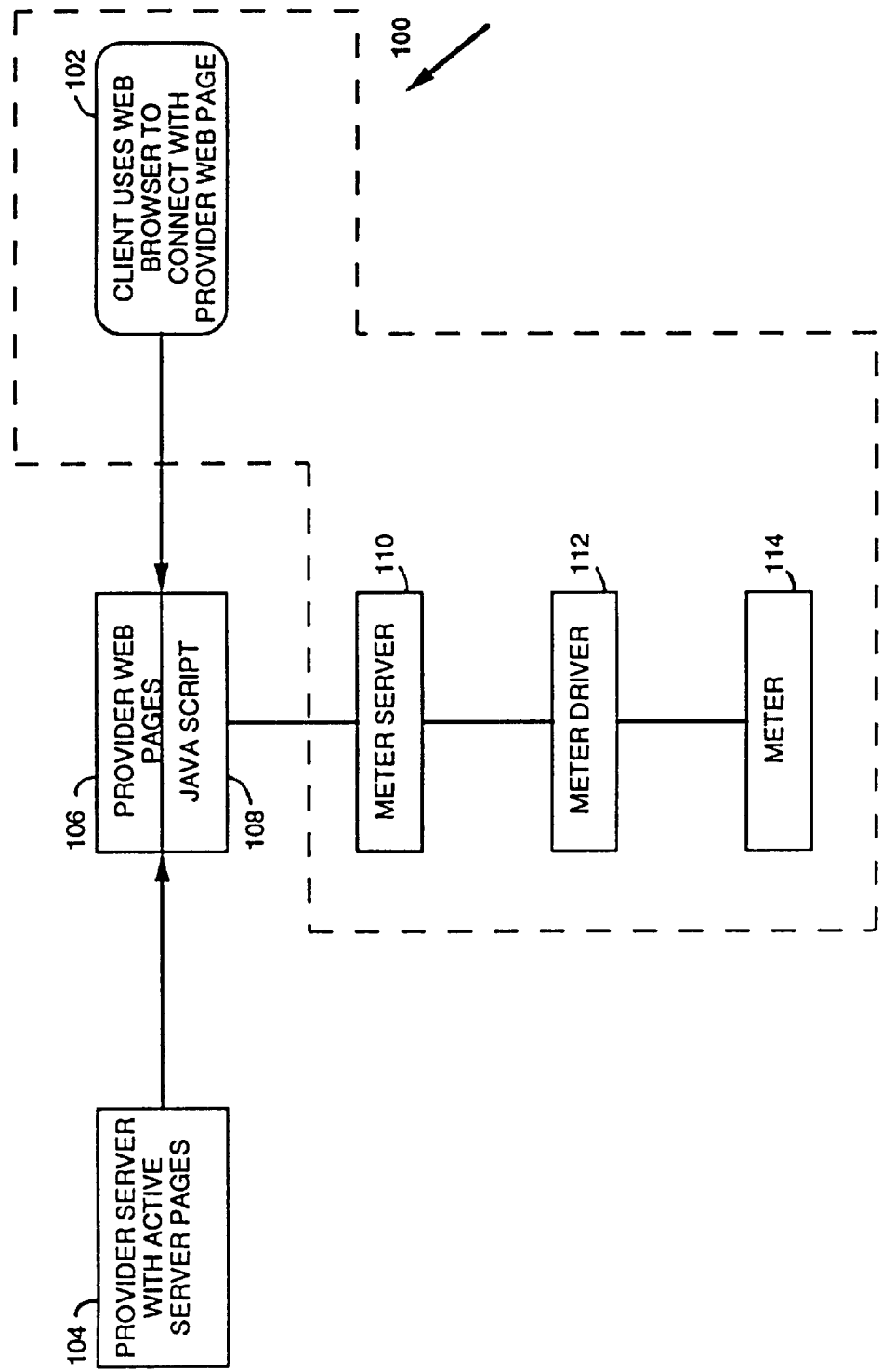
FIG. 2 is a relational diagram of the elements of the present invention showing the relationship between client, provider server and the postage meter.

In FIG. 2, there is shown a relationship diagram that illustrates the relationship of the system elements.

Subsystem 100 is representative of the client node functionalities that together interface with a provider server 104 through the use of JAVA script 108. Through a client node, the system user utilizes a web browser, at element 102, to connect with a provider 104 web page 106 having certain downloadable elements. The provider web page 106 is a Hypertext Markup Language (HTML) page that contains JAVA script. These elements include active server pages that can be downloaded to the client node as required. HTML is known in the art and a detailed description of its architecture and implementation is not required for an understanding of the present invention.

The provider web site 104 comprises a carrier management application (similar in functionality to the none-web-based ASCENT™ carrier management system which is commercially available from Pitney Bowes Inc. of Stamford, Conn.) for preparing parcels or mailpieces to be shipped. The application further comprises either rating functionality or means of accessing remote rating functionality or related services; in addition, the application might have carrier selection functionality for selecting a carrier from among two or more carriers. The selection is based upon factors that include rates, class of services, time of pickup or delivery, tracking capabilities, etc. Parcel preparation might include production of labels, production of a carrier manifest representative of the transactions that the system user has with a particular carrier, printing of postage if the selected carrier is the United States Postal Service (USPS), and determination of the shipping parameters required or desired for the shipping of the parcel or mailpiece. The parameters include destination zone or location, desired time and/or date of delivery, and whether or not any special services are connected with the The client node can be one of a plurality of client nodes as is shown in FIG. 1B, or simply a single node as is shown in FIG. 1A. The client node includes a personal computer for processing data and running certain software applications, a monitor for providing a human interface with: the personal computer so as to view screens established by the application, and a keyboard for data entry. A network or modem link is also included that will allow access to the internet. The link, however, could be any intranet or hard-wired communication solution requiring a browser entry. Additional peripherals include a postage meter for evidencing payment, a scanner for scanning barcodes and similar data, as well as a weighing scale for inputting weight to the application. The weighing scale and/or postage meter is linked to the subsystem via a communication link which is preferably a hardwire, serial communication link.

The internet link connects the system user's entry to the internet at step 102 with provider web pages 106 that are being posted by the provider server at 104. JAVA script 108 is contained within the web page and is used to connect the meter server 110 on the client side and to make the meter server 110 available for client use in conjunction with the meter driver 112 and communication with the postage meter 114. The method by which this relationship is further defined is shown in the flowcharts of FIG. 3 and FIG. 4.

Figure 3:
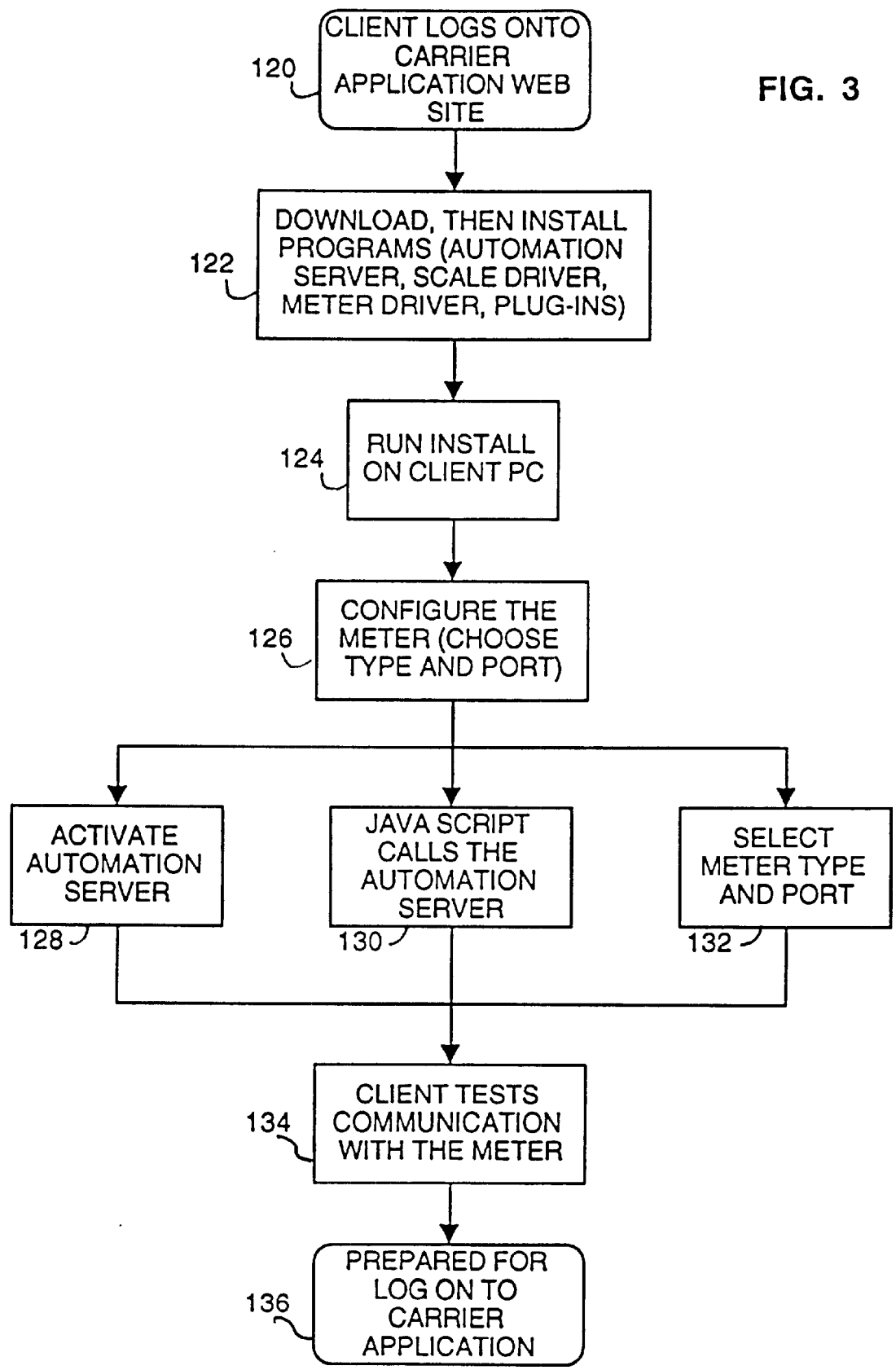
FIG. 3 is a flowchart of the method of the present invention from client initiation to preparation for logging onto the carrier application presented by the provider server; this is the download and setup process.
Figure 4:
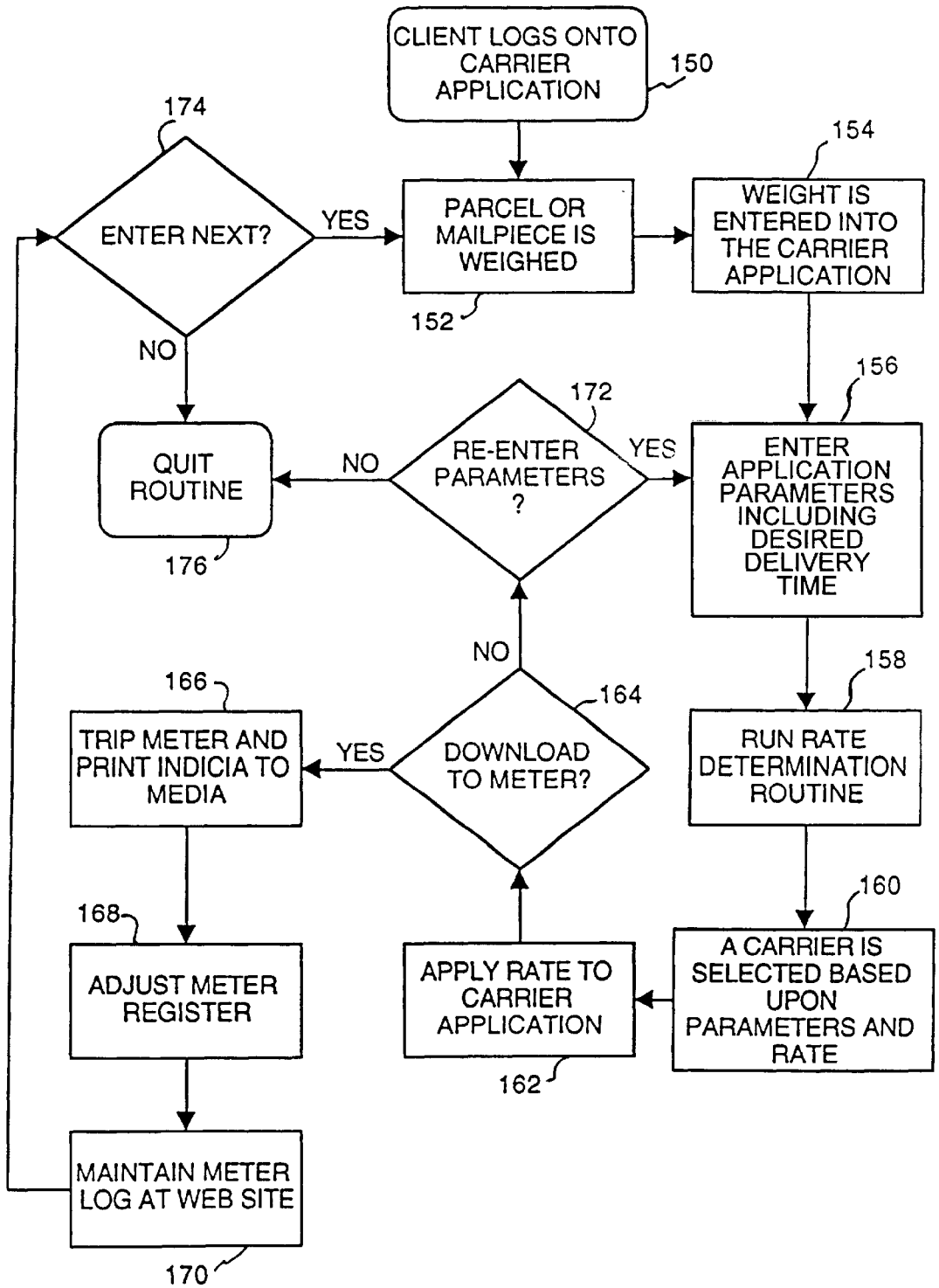
FIG. 4 is a flowchart of the method of the present invention from carrier application login to tripping of the meter for printing of an indicia to a label or to the mailpiece itself.

Turning to FIG. 3, there is shown the flowchart of the method of the present invention from client initiation to preparation for logging onto the carrier management application presented by the provider server.

The method flow begins at step 120 where the client logs onto the provider's carrier management application web site by utilizing a browser for internet entry. Browsers are known in the art and a detailed discussion of them is not necessary for an understanding of the present invention. From step 120, the method advances to step 122 where the system user selects several programs to be downloaded from the web site; these include an automation server, the meter driver that corresponds to the postage meter being employed at the client node, and any "plug-ins" that might be required for communication patching by the web browser. The programs are downloaded to the client node where they are saved for continued future use.

Plug-ins are Dynamic Link Libraries (DLL) that meet specifications defined by the web browser. DLLs are used to extend the functionality of the web browser beyond the capabilities built into their architecture by the browser developer. JAVA script will run, start its activation procedure, and then connect with the meter server on the client side to make the meter available for client use and as an output from the carrier management application. The JAVA script can communicate with the Active-X automation server directly when using INTERNET EXPLORER™ as the browser for entry to the internet; however, when using a browser, such as NETSCAPE™, a NETSCAPE "plug-in" is needed on the client side so that the JAVA script can communicate with the automation server through the plug-in. The plug-in serves as a communication patch through which the automation server "talks" to the JAVA script. Once the connection to the postage meter has been completed, the data from the postage meter can be either automatically or manually transferred back to the carrier management application to update the required logs or postage tracking routines. The information is then saved as an initiation set to a memory resident in the provider server or a client node, wherein the initiation set may be called by the client node to establish the initiation set.

Active-X is a set of integration technologies that enables software components to inter-operate in a networked environment using any programming language. Active-X controls are individual components that have a specific function (i.e., displaying a list box, displaying a command button, specified time delays, etc.) that when used together can create navigation tools and complete on-line applications. Active-X provides support for a wide-range of tools which include MICROSOFT® VISUAL BASICT™. Active-X is known in the programming arts and a detailed description of Active-X is not required for an understanding of the invention at hand. A detailed discussion of a method and system for establishing a standard peripheral server can be found in U.S. Pat. No. 6,282,590, and its teaching is incorporated herein by reference.

JAVA script, on the other hand, is a non-compiled programming language that is included in web pages and are run with a client web browser. JAVA script can perform a number of functions that benefit the ability of the provider server to download a trip signal to the postage meter through the browser. These functions include: the ability to read a rate from the appropriate field of the carrier application and to define it in terms of a selected currency ($ per transaction); the "get rate" instructions; automatic or manual trip of the postage meter; instructions to register the meter trip; communication setup; the ability to look for, and print, multiple indicias; the ability to post error messages to the client and/or the system; and, the parameters for conducting a system test of the communication link between the postage meter and the client node.

Returning to step 122, after download, the programs are installed at the client node and all future calls for the automation server will come from the client node. From step 122, the method advances to step 124 where the INSTALL routine is run before advancing to step 126 where the postage meter is configured by choosing a postage meter type and a communication port. As a part of configuration, three activities occur essentially simultaneously that prepare the client node for communication with the postage meter; these activities occur at steps 128, 130, and 132. At step 128 the Active-X automation server is activated at the client node, is called under the control of JAVA script at step 130, and the meter type and communication port are selected at step 132. The method then advances to step 134 where the client tests the communication link with the postage meter. If the communication test is successful, then the system user logs onto the carrier management application at step 136.

FIG. 4 is a flowchart of the method of the present invention from carrier management application login to reading of the rate from the required fields of the application via the browser before printing the postage in the form of an indicia.

At step 150, the system user, or "client," logs onto the carrier management application of the provider server. From step 150, the method advances to step 152 where the client places the parcel or mailpiece to be shipped on the weighing scale to be weighed. The method advances to step 154 where the weight is input to the carrier management application through a manual entry or though a web browser as described in related U.S. Pat. No. 6,356,882. The method then advances from step 154 to step 156 where the system user enters shipping parameters under prompt from the shipping application. These parameters may include: choice of carrier; class of service; parcel dimension (for dimensional weighing requirements); special handling instructions; destination codes and addresses; an addressee; delivery instructions; and, time parameters. The method then advances to step 158.

At step 158 the application runs a rate determination routine within the bounds of the selected parameters. Then, based upon the parameters entered into the application at step 156 and the rate determination of step 158, a carrier is selected at step 160. If the carrier is the USPS, it would be desireable to print postage in the form of an indicia based upon a trip command downloaded through the browser. In addition, any carrier that provides for a label or similar indicia having evidence of payment would find the triggering of a meter or similar device though the browser advantageous.

The method advances from step 160 to step 162 where the rate is applied to the carrier application before advancing to a query at step 164. At step 164, the method queries as to whether a transaction cost in the form of postage, or similar evidence of payment, is to be downloaded to a meter. If the response to the query is "NO," then the method advances to a further query at step 172 which seeks to determine if the application parameters are to be re-entered, If the response to the query is "YES," then the method re-enters the method flow at step 156; however, if the response to the query at step 172 is "NO," then the method advances to step 176 where the system user quits the routine.

Returning to the query at step 164, if the response to the query is "YES," then the method advances to step 166 where the meter is tripped through the browser and an indicia is printed to a label or directly to the mailpiece. Upon tripping the meter and/or printing the indicia, the meter register is decremented or incremented at step 168 as required. Additionally, a successful/not successful response from the meter gives the system user an indication of funds status. An entry, at step 170, to a log or manifest at the web site is then made which is representative of the printed postage or value expended. From step 170, the method advances to the query at step 174 which asks whether or not a next parcel or mailpiece is to be processed. If the response to the query is "NO," then the method advances to step 176 where the system user quits the routine. If, however, the response to the query at step 174 is "YES," then the method re-enters the method flow at step 152.

While certain embodiments have been described above in terms of the system within which the method may reside, the invention is not limited to such a context.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of printing an indicia by a postage meter from a browser under control of a carrier management application in a data processing system, wherein said data processing system comprises a client node in communication with a provider server, and wherein said tripping of said postage meter causes an indicia to be printed by said postage meter wherein said indicia is indicative of a cost for shipping a parcel or a mailpiece, said method comprising the steps of:

(a) logging onto a carrier manager application web site, through a web browser;
   (b) downloading a set Of programs from said web site to said client node, wherein said set of programs is installable on a personal computer located at said client node and is for establishing control of said meter which is connected to said client node under direction of said carrier management application;
   (c) installing said set of programs on said personal computer at said client node;
   (d) configuring said postage meter;
   (e) logging onto said carrier management application;
   (f) entering a set of application parameters representative of a parcel or a mailpiece to be shipped, and determining a cost of said shipment based upon said set of application parameters; and
   (g) sending a print indicia command to said postage meter, through said web browser, wherein said titp signal is representative of said cost.

2. The method of claim 1, wherein said postage meter is configured through said web site by:

(a) identifying a set of characteristics of said postage meter; and
   (b) downloading said postage meter driver from said web site to said postage meter in accordance with said set of characteristics.

3. The method of claim 1, wherein a system user tests a communication link between said postage meter and said client node prior to logging onto said carrier management application at said web site.

4. The method of claim 1, wherein each of said steps (b) through (d) are individually saved as an initiation set to a memory resident in said provider server and wherein said initiation set may be called by said client node to establish said initiation set.

5. The method of claim 1, wherein each of said steps (b) through (d) are individually saved as an initiation set to a memory resident in said client node and wherein said initiation set may be called by the client node to establish said initiation set.

6. The method of claim 1, wherein said set of programs comprises an automation server and a postage meter driver.

7. The method of claim 6, wherein said downloading of said automation server and said postage meter driver further comprises the steps of installing and configuring said automation server and said postage meter driver at said client node and wherein said installation and said configuration preclude the necessity for repeating said download for future transactions utilizing said postage meter in conjunction with said web site.

8. The method of claim 1, wherein said client node is one of a plurality of client nodes that are linked to said data processing system.

9. The method of claim 8, wherein each one of said plurality of client nodes comprises a postage meter for printing postage onto a label or a mailpiece.

10. The method of claim 1, wherein said logging step further comprises the step of inputting a set of shipping parameters into said carrier management application.

11. The method of claim 10, wherein said set of shipping parameters further comprises a destination.

12. The method of claim 10, wherein said set of shipping parameters further comprises a class or type of service by which said parcel or said mailpiece will be shipped.

13. The method of claim 10, wherein said set of shipping parameters further comprises a desired period of time for a delivery of said parcel or of said mailpiece.

14. The method of claim 10, wherein said shipping parameters includes a weight measurement which is entered into said carrier management application for the purpose of obtaining a cost of shipping said parcel or said mailpiece, said cost determined as a function of said weight and said set of shipping parameters.

15. A system for sending a print indicia command to a postage meter from a browser under control of a carrier management application in a data processing system, wherein said data processing system comprises a client node in communication with a provider server, and wherein said tripping of said postage meter causes an indicia to be printed by said postage meter wherein said indicia is indicative of a cost for shipping a parcel or a mailpiece, said system comprising:

(a) a web site for a provider server, said web site further comprising:

(i) provider web pages;

(ii) script functionality resident in said provider web pages for linking with a postage meter driver resident in a postage meter connected at said client node;

(b) said postage meter at said client node, said postage meter further comprising:

(i) said postage meter driver;

(ii) a postage meter server resident at said client node and callable by said client node under control of said script functionality;

(iii) script activation capability for allowing said script at said client node to link with said postage meter by utilizing said postage meter driver;

(c) a communications link for linking said web site and said postage meter at said client node, said communications link further comprising:

(i) a browser for accessing said web site by said client node;

(ii) a network interface routine for allowing access to a network wherein said web site resides; and (iii) communications means for physically interfacing said postage meter with said network an allowing said tripping of said postage meter; and (d) selection means for selecting said cost for shipping of said mailpiece and wherein said selection causes said postage meter to trip, thereby causing said indicia to be printed.

16. The system of claim 15, wherein said script functionality is Java script.

17. The system of claim 15, wherein said browser requires a set of plug-ins for communication to said postage meter server.

18. The system of claim 15, wherein said postage meter server is an Active-X automation server resident on said web site and downloadable to said client node.

19. The system of claim 15, wherein said client node is one of a plurality of client nodes, each of said plurality of client nodes linked by communication means to said provider server, said communication means for establishing a communications link between said client node and said provider server.

20. The system of claim 15, where said script functionality further comprises a set of instructions for performing one or more activities.

21. The system of claim 20, wherein said script functionality further comprises display functionality for displaying said cost in a particular format.

22. The system of claim 20, wherein said script functionality further comprises a "carrier selection" function for directing said cost to be transmitted to said carrier management application.

23. The system of claim 20, wherein said script functionality further comprises a setup function for storing a set of steps to be used for activating said script functionality, said postage meter driver, and said postage meter server.

\* \* \* \* \*